(12) United States Patent
Shaharabany et al.

(10) Patent No.: US 8,935,465 B1
(45) Date of Patent: Jan. 13, 2015

(54) SYSTEM AND METHOD OF COMMUNICATING COMMAND DATA IN A MASTER-SLAVE ENVIRONMENT

(71) Applicant: Sandisk Technologies Inc., Plano, TX (US)

(72) Inventors: Amir Shaharabany, Kochav Yair (IL); Hadas Oshinsky, Kfar Saba (IL); Rotem Sela, Haifa (IL)

(73) Assignee: Sandisk Technologies Inc., Plano, TX (US)

( * ) Notice: Subject to any disclaimer, the term of this patent is extended or adjusted under 35 U.S.C. 154(b) by 0 days.

(21) Appl. No.: 14/305,758

(22) Filed: Jun. 16, 2014

(51) Int. Cl.
G06F 12/00 (2006.01)
G06F 13/00 (2006.01)
G06F 3/06 (2006.01)
G06F 12/02 (2006.01)

(52) U.S. Cl.
CPC ............ *G06F 3/0659* (2013.01); *G06F 3/0679* (2013.01); *G06F 3/0614* (2013.01); *G06F 12/0246* (2013.01)
USPC ........................................................ 711/103

(58) Field of Classification Search
None
See application file for complete search history.

(56) References Cited

U.S. PATENT DOCUMENTS 8,700,834 B2 4/2014 Horn et al.
2013/0326141 A1 12/2013 Marcu et al.
2014/0089568 A1 3/2014 Chung et al.

OTHER PUBLICATIONS

"Universal Flash Storage (UFS) Unified Memory Extention," JESD220-1, Version 1.0, Sep. 2013, JEDEC Standard, JEDEC Solid State Technology Association, 52 pages.
"Universal Flash Storage (UFS)," JESD220B (Revision of JESD220A, Jun. 2012), Version 2.0, Sep. 2013, JEDEC Standard, JEDEC Solid State Technology Association, 366 pages.

*Primary Examiner* — Kevin Verbrugge
(74) *Attorney, Agent, or Firm* — Toler Law Group, PC

(57) ABSTRACT

A method includes, in a data storage device including a non-volatile memory, performing receiving, from a host device in a master-slave configuration with the data storage device, a first notification corresponding to a first read command. The method also includes storing, based on the first notification, a first entry in a notification queue. The first entry corresponds to the first read command. The method further includes storing first data corresponding to a second command at a location of the non-volatile memory. The location corresponds to an address to be read upon execution of the first read command. The second command is associated with an operation to be performed by the host device. The method includes, after storing the second data, setting an indicator corresponding to the first entry. The set indicator conveys that the data storage device is ready to execute the first read command.

20 Claims, 3 Drawing Sheets

SYSTEM AND METHOD OF COMMUNICATING COMMAND DATA IN A MASTER-SLAVE ENVIRONMENT

FIELD OF THE DISCLOSURE

The present disclosure is generally related to communicating command data in a master-slave environment.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

A data storage device (e.g., a non-volatile data storage device) may be coupled to a host device. The data storage device and the host device may each have a corresponding volatile memory, such as a random access memory (RAM), for temporary storage. However, a size of a host RAM is typically larger than a size of a data storage device RAM (e.g., a RAM of a controller of the non-volatile data storage device). When the host device and the data storage device are configured to communicate using dual channel communication (e.g., both devices may issue and receive commands from the other device), the host device and the data storage device may utilize a unified memory architecture (UMA) to enable the data storage device to use the host RAM as a working memory (e.g., a level two physical table cache, a write buffer, etc.) of the data storage device. For example, one or more protocols may enable the data storage device to utilize (e.g., control) a portion of the host RAM designated for use by the data storage device.

However, when the host device and the data storage device use single channel communication, such as when the host device and the data storage device are in a master-slave configuration (e.g., the host device is a master device and the data storage device is a slave device), the data storage device may not be able to issue commands to the host device. Accordingly, when in the master-slave configuration (e.g., a master-slave environment) the data storage device may not be able to control and/or access the host RAM.

SUMMARY

Techniques are disclosed for communicating command data in a master-slave environment (e.g., a master-slave configuration). The command data may enable using a unified memory architecture (UMA) in the master-slave environment. To enable the UMA architecture, a host device (e.g., a master device) may include a unified memory (UM) that may be utilized by a data storage device (e.g., a slave device). To enable the data storage device to send command data to the host device, the host device may send a notification to the data storage device. The notification may correspond to a read command (e.g., a unified memory (UM) enabling command), to be issued by the host device, to read a location of a memory (e.g., a non-volatile memory) of the data storage device. Based on the notification, the data storage device may populate an entry in a notification queue associated with a controller of the data storage device. The entry may be associated with a corresponding indicator that, when set, indicates that the data storage device is ready to execute the read command (e.g., the UM-enabling command).

When the data storage device decides to use the read command for the purposes of communicating command data (e.g., UM command data, operational command data, or information request command data) to the host device, the data storage device may store the command data at the location of the memory (of the data storage device) to be read based on the read command. After the command is written to the location of the memory, the data storage device may set the indicator. When the indicator is set, the host device may send (to the data storage device) the read command to read from the location of the memory and may receive the command data responsive to the data storage device executing the read command.

The host device may process the command data. For example, the host device may determine whether the command data corresponds to a UM read operation or to a UM write operation. If the command data correspond to a UM read operation, the host device may read a portion of the UM of the host device and may issue a write command to write the data read from the portion of the UM to the data storage device. If the command data corresponds to a UM write operation, the host device may issue a read command to read data from a portion of the memory of the data storage device and may write the data read from the portion to the memory (of the data storage device) to the UM of the host device.

By notifying the data storage device of a read command (e.g., an available UM-enabling read command), the host device enables the data storage device to generate command data (e.g., UM operation data) that may be provided to the host device. Accordingly, the host device (e.g., the master device) may receive directions (e.g., instructions) from the data storage device (e.g., the slave device) to access the UM of the host device without the data storage device being able to issue commands directly to the host device because of a master-slave relationship.

DETAILED DESCRIPTION

Particular embodiments of the present disclosure are described with reference to the drawings. In the description, common features are designated by common reference numbers throughout the drawings.

Figure 1:
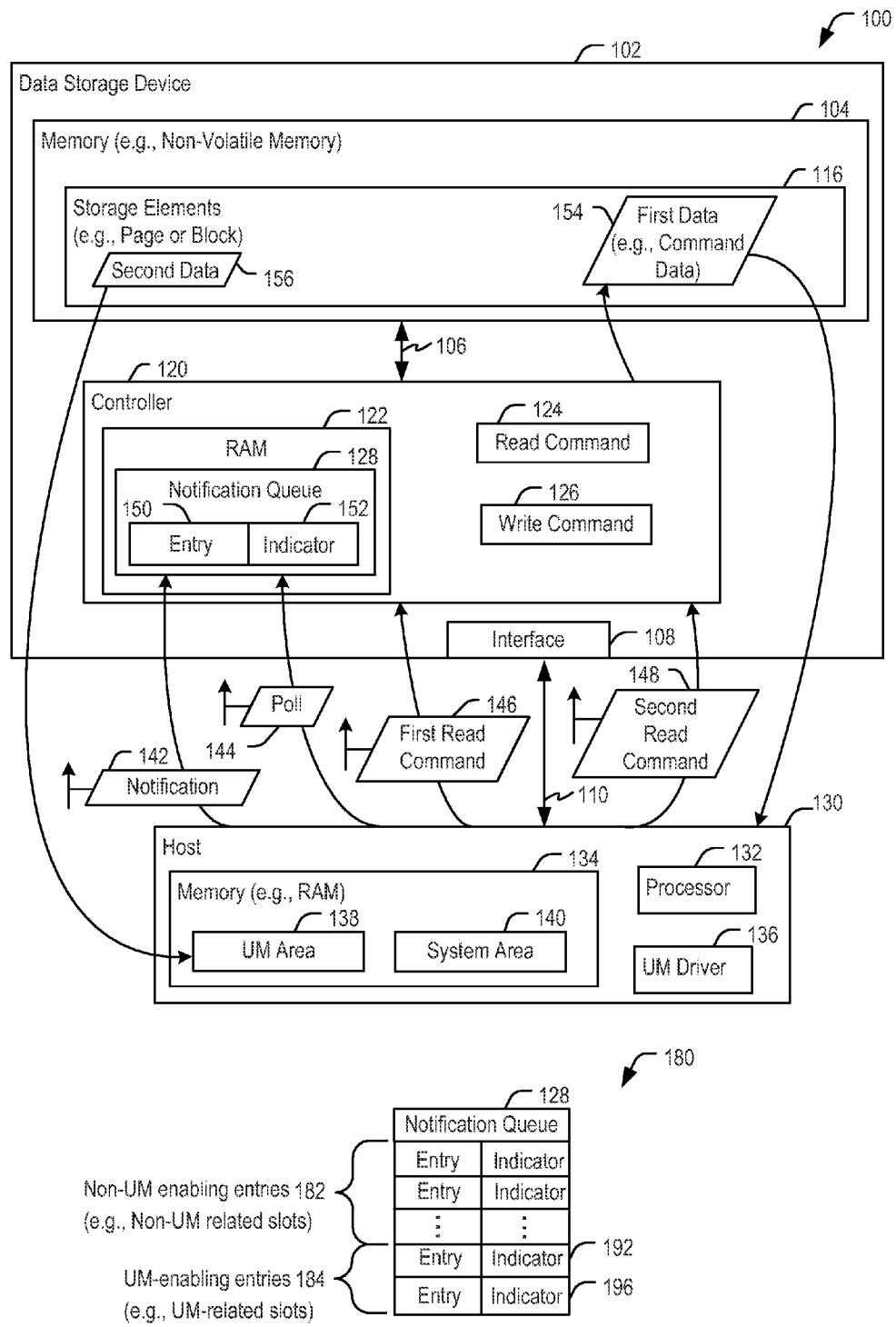
FIG. 1 is a block diagram of a particular illustrative embodiment of a system that enables communication of command data in a master-slave environment.

FIG. 1 is a block diagram of a particular illustrative embodiment of a system 100 including a data storage device 102 and a host device 130. The system 100 may enable communication of command data in a master-slave environment (e.g., a master-slave configuration) where the host device 130 is a master device and the data storage device 102 is a slave device. For example, the system 100 may enable use of a unified memory architecture (UMA) where the data storage device 102 may access a unified memory portion of a memory 134 of the host device 130.

The data storage device 102 may be embedded within the host device 130, such as in accordance with an embedded MultiMedia Card (eMMC®) (trademark of Joint Electron Devices Engineering Council (JEDEC) Solid State Technology Association, Arlington, Va.) configuration. Alternatively, the data storage device 102 may be removable from (i.e., "removably" coupled to) the host device 130. For example, the data storage device 102 may be removably coupled to the host device 130 in accordance with a removable universal serial bus (USB) configuration.

The host device 130 may include a processor 132, the memory 134, and a unified memory (UM) driver 136. The memory 134, such as a random access memory (RAM), may include a unified memory (UM) area 138 (e.g., a UM portion) and a system area 140 (e.g., a system portion). The system area 140 may be controlled and/or utilized by the host device 130. For example, the system area 140 may be available (e.g., utilized) by the processor 132 and/or an operating system (OS) of the host device 130. The UM area 138 may be available for use by the data storage device 102, and the host device 130 may be configured to access (e.g., read to or write from) the UM area 138 at the direction (e.g., instruction) of the data storage device 102. For example, the UM area 138 may be associated with a unified memory architecture (UMA) and may be allocated for use by the data storage device 102. To illustrate, the UM area 138 may be logically assigned to the data storage 102 as if the UM area 138 were a physical memory (e.g., a RAM) of the data storage device 102, and the data storage device 102 may use the UM area 138 a working memory (e.g., a level two physical table cache, a write buffer, etc.) of the data storage device 102.

The data storage device 102 may be coupled to the host device 130 via a communication path 110, such as a wired communication path and/or a wireless communication path. For example, the data storage device 102 may include an interface 108 (e.g., a host interface) that enables communication (via the communication path 110) between the data storage device 102 and the host device 130, such as when the interface 108 is coupled to the host device 130. The host device 130 and the data storage device 102 may communicate with each other (via the communication path 110) using an embedded memory protocol. The embedded memory protocol may correspond to single channel communication in which the host device 130 and the data storage device 102 are in a master-slave configuration. For example, the host device 130 may be a master device, and the data storage device 102 may be a slave device. To illustrate, the embedded memory protocol may be an embedded flash memory protocol, such as an eMMC® protocol. To enable use of the embedded memory protocol, each of the host device 130 and the data storage device 102 may include an embedded memory protocol driver (e.g., an eMMC® protocol driver). The host device 130 may use the embedded memory protocol to issue one or more commands to the data storage device 102, such as one or more requests to read data from or write data to a memory (e.g., a memory 104) of the data storage device 102. The data storage device 102 may use the embedded memory protocol to respond to the one or more commands issued by the host device 130.

The data storage device 102 may include the memory 104, such as a non-volatile memory, coupled to a controller 120. The controller 120 may be coupled to the memory 104 via a bus 106, an interface, another structure, or a combination thereof. The memory 104 may have a three dimensional (3D) memory configuration. Alternatively, the memory 104 may have another memory configuration, such as a two dimensional (2D) memory configuration. The plurality of storage elements may be configured in one or more pages, wordlines, and/or blocks. The plurality of storage elements may be included in a single die or in multiple dies. Although not illustrated in FIG. 1, the memory 104 may include read/write circuitry configured to read data from or write data to one or more of the plurality of memory blocks 162.

The controller 120 may include a random access memory (RAM) 122. The RAM 122, such as a volatile memory, may be configured to store a notification queue 128. The notification queue 128 may include an entry 150 and an indicator 152 corresponding to the entry 150. The entry 150 may correspond to a command issued to the data storage device 102 by the host device 130. A value of the indicator 152 may convey to the host device 130 whether the data storage device 102 is ready to execute the command that corresponds to the entry 150. For example, when the indicator 152 is cleared (e.g., de-asserted, such as a logical zero value), the data storage device 102 may not be ready to execute the command that corresponds to the entry 150. When the indicator is set (e.g., asserted, such as a logical one value), the data storage device may be ready to execute the command that corresponds to the entry 150. In some embodiment, the indicator 152 may be a bit included in the entry 150. In other embodiments, the indicator 152 may correspond to a pin (e.g., a physical contact) of the interface 108, and the controller 120 may set the indicator 152 by activating a pin of the interface 108.

The controller 120 may be configured to receive data and commands (e.g., instructions) from the host device 130 and may send data to the host device 130 based on the commands. For a particular command, such as a read command or a write command, received from the host device 130, the controller 120 may receive a particular notification from the host device 130. The particular notification may be received prior to or in conjunction with the particular command. The particular notification may indicate whether the particular command corresponds to a read operation or a write operation, an amount of data to be read or written, and a location of the memory 104 to be read from or written to. For example, the particular notification may include a portion or an entirety of the particular command.

In response to receiving the particular notification, the controller 120 may populate the entry 150 to identify the particular command. The controller 120 may clear the indicator 152 each time the controller 120 populates the entry. When the controller 120 is ready to execute the particular command (e.g., to activate the particular command), the controller 120 may set the indicator 152 corresponding to the entry 150.

The host device 130 may detect that the indicator 152 is set, such as by periodically polling a value of the indicator 152. When the host device 130 determines that the indicator 152 is set, the host device 130 may send the particular command to the data storage device 102 for execution. In some embodiments, the particular command may be a read command that instructs the data storage device 102 to read data from a sector (e.g., 512 bytes) of the memory 104. The read command may enable the data storage device 102 to communicate the data, such as command data (e.g., UM command data, operational command data, or information request command data), to the host device 130. For example, the command data may be UM command data that enables the data storage device 102 to access to the unified memory area 138 of the host device 130, as described further herein. As another example, the command data may be operation command data that enables the data storage device 102 to instruct the host device 130 to perform an action, such as putting the data storage device 102 in a sleep mode, providing additional power to the data storage device 102, providing idle time to the data storage device 102 (e.g., throttling one or more commands to be sent to the data storage device 102), etc., as illustrative, non-limiting examples. As another example, the command data may include information request command data that enables the data storage device 102 to instruct the host device 130 to provide information (e.g., vendor specific information, such as power consumption information) from the host device 130 to the data storage device 102. The information provided by the host device 130 may include a sector of data (e.g., 512 bytes) that is written from the host device 130 to the data storage device 102.

An illustrative example of the notification queue 128 is depicted at 180. The notification queue 128 may be configured as an array of multiple entries (e.g., multiple slots). The multiple entries may include a first group of entries 182 and a second group of entries 184. The first group of entries 182 may be associated with non-UM related entries (e.g., non-UM-enabling slots). For example, the non-UM related entries may be associated with read commands and/or write commands issued by the host device 130 that do not enable the data storage device 102 to cause a UM operation to be performed by the host device 130. The second group of entries 184 (e.g., UM-enabling slots) may be associated with read commands issued by the host device 130 that enable the data storage device 102 to communicate command data to the host device 130. For example, the read commands issued by the host device 130 may enable the data storage device 102 to cause a UM operation to be performed by the host device 130. Although the second group of entries 184 (e.g., one or more entries) are described as "UM-enabling" slots, the second group of entries 184 are not limited to enabling the data storage device 102 to cause one or more UM operations to be performed by the host device. For example, the second group of entries 184 may alternatively or additionally be used to enable the data storage device 102 to communicate command data, such as operational command data and/or information request command data, to the host device 130.

As an example of the notification queue 128, a first portion, such as a representative entry 192, of the notification queue 128 may be allocated to enable the data storage device 102 to direct the host device 130 to perform a read operation on the unified memory area 138 of the host device 130. The representative entry 192 may include or correspond to the entry 150 of the system 100. A second portion, such as a representative entry 196, of the notification queue 128 may be allocated to enable the data storage device 102 to direct the host device 130 to perform a write operation on the unified memory area 138 of the memory of the host device 130. Alternatively, or in addition, the notification queue 128 may include one or more other entries included in the second group of entries 184. For example, a third portion (e.g., a representative entry) of the notification queue 128 may be allocated to enable the data storage device 102 to direct the host device 130 to execute one or more operational commands, such as putting the data storage device 102 in a sleep mode, providing additional power to the data storage device 102, providing idle time to the data storage device 102 (e.g., throttling one or more commands to be sent to the data storage device 102), etc., as illustrative, non-limiting examples. As another example, a fourth portion (e.g., a representative entry) of the notification queue 128 may be allocated to enable the data storage device 102 to direct the host device 130 to execute one or more information request commands, such as providing vendor specific information to the data storage device 120.

Although the notification queue 128 is illustrated at 180 as including four entries, the notification queue 128 may include fewer than four entries, such as a single entry, or more than four entries. For example, when the notification queue 128 include a single entry, the single entry may correspond to the second group of entries 184 and may enable the data storage device 102 to direct the host device 130 to perform a read operation or a write operation on the unified memory portion of the memory of the host device 130.

The data storage device 102 may receive notifications from the host device 130 corresponding to commands (e.g., non-UM-enabling commands, such as read commands and/or write commands) issued by the host device 130 that do not enable the data storage device 102 to cause a UM operation to be performed by the host device 130. The notification corresponding to a non-UM-enabling command may identify a type of operation (e.g., a read operation or a write operation) to be performed on the memory 104, a location of the memory 104, an amount of data to be read or written, or a combination thereof, as illustrative, non-limiting examples. The controller 120 may populate an entry, such as an entry included in the first group of entries 182 of the notification queue 128, based on a received non-UM-enabling command. The controller 120 may set an indicator that corresponds to the populated entry when the controller 120 (e.g., the data storage device 102) is ready to execute the non-UM-enabling command. When the controller 120 receives the non-UM-enabling command to be executed from the host device 130, the controller 120 may read data from or write data to the memory 104 based on the non-UM-enabling command.

Additionally, the data storage device 102 may receive notifications from the host device 130 corresponding to commands (e.g., read commands, such as UM-enabling read commands) issued by the host device 130 that enable the data storage device 102 to communicate command data to the host device 130, such as command data to cause UM operations to be performed by the host device 130. The controller 120 may populate an entry, such as an entry included in the second group of entries 182 of the notification queue 128, based on a received notification that corresponds to the read command (e.g., a UM-enabling command). For example, the controller 120 may populate the entry 150 based on the received notification that corresponds to the read command (e.g., the UM-enabling command). The notification corresponding to the read command (e.g., the UM-enabling command) may include data that identifies an address of the memory 104 to be read, indicates an amount of data to be read (e.g., a sector), or a combination thereof, as illustrative, non-limiting examples. In addition to populating the entry 150, the controller 120 may also clear the indicator 152 corresponding to the entry 150 when the entry 150 populated, such as before, during or after population of the entry 150.

When the entry 150 is associated with a notification that corresponds to a read command (e.g., a UM-enabling command), the controller 120 may determine whether or when to communicate command data to the host device 130. For example, the command data may initiate access to (e.g., cause the host device 130 to read data from or to write data to) the unified memory area 138 of the host device 130. For example, the controller 120 may store first command data (e.g., UM command data) at a storage location indicated by the entry 150. The first command data, when read by the host device 130, may cause the host device 130 to perform a read operation at the UM area 138 and to provide the data read from the UM area 138 to the data storage device 102. The host device 130 may provide the data read from the UM area 138 to the data storage device 102 by issuing a write command to the data storage device 102. As another example, the controller 120 may store second command data (e.g., UM command data) at a storage location indicated by the entry 150. The second command data, when read by the host device 130, may cause the host device 130 to write particular data to the UM area 138. To illustrate, the second command data may cause the host device 130 is to perform a write operation to store the particular data into the UM area 138. Based on the second command data (to write the particular data to the UM area 138), the host device 130 may issue a read command (e.g., a non-UM-enabling read command) to receive the particular data from the particular storage location of the memory 104 and may write the particular data to the UM area 138.

As another example, the controller 120 may store third command data (e.g., operational command data) at a storage location indicated by the entry 150. The third command data, when read by the host device 130, may cause the host device 130 to perform an action, such as putting the data storage device 102 in a sleep mode, providing additional power to the data storage device 102, providing idle time to the data storage device 102 (e.g., throttling one or more commands to be sent to the data storage device 102), etc., as illustrative, non-limiting examples. As another example, the controller 120 may store fourth command data (e.g., information request command data) at a storage location indicated by the entry 150. The fourth command data, when read by the host device 130, may cause the host device 130 to provide information (e.g., vendor specific information, such as power consumption information) from the host device 130 to the data storage device 102. The information provided by the host device 130 may include a sector of data (e.g., 512 bytes) that is written from the host device 130 to the data storage device 102.

The controller 120 may set the indicator 152 when the controller 120 is ready to execute the read command (e.g., the UM-enabling command). For example, the controller 120 may set the indicator 152 after the controller 120 stores data (e.g., UM command data, the operational command data, or the information request command data) at a location of the memory 104 indicated by the entry 150. When the controller 120 receives the read command (e.g., the UM-enabling command) from the host device 130, the controller 120 may read data from the memory 104 based on the read command (e.g., the UM-enabling command).

When the data storage device 102 (e.g., the controller 120) executes a particular command (e.g., a non-UM-enabling command and/or a UM-enabling command), the controller 120 may send, based on the particular command, data and commands to the memory 104 and may receive data from the memory 104. For example, the controller 120 may send one or more write commands, such as a write command 126, to the memory 104 to store the data to a specified address of the memory 104. The write command may specify a physical address of a portion of the memory 104 (e.g., a physical address of a word line of the memory 104) that is to store the data. The controller 120 may be configured to send a read command to the memory 104 to access data from a specified address of the memory 104. As an example, the controller 120 may send a read command, such as a read command 124, to access the data stored in the memory 104. The read command may specify the physical address of a portion of the memory 104 (e.g., a physical address of a word line storing the data) to be read.

The UM driver 136 may be configured to identify data (e.g., command data) read from the data storage device 102 that corresponds to an action (e.g., a UM operation) or an operation to be performed and/or executed by the host device 130. Although the driver 136 is described as a "UM" driver, the driver 136 is not limited to identifying UM operations indicated by the command data. For example, the driver 136 may process the command data to identify (e.g., determine) UM commands, operational command, or information request commands to be performed and/or executed by the host device 130. The host device 130 may receive the command data from the data storage device 102 based on a read command issued from the host device 130 to the data storage device 102. The command data may be received as part of a communication sent from the data storage device 102 using the embedded memory protocol. The communication may be processed (e.g., parsed) by a lower layer driver (e.g., low level hardware), such as an embedded memory protocol driver (e.g., eMMC® protocol driver), of the host device 130. After being processed by the lower layer driver, the command data included in the communication may be processed (e.g. parsed) by an upper layer driver, such as the UM driver 136, to determine whether the command data corresponds to UM command data, operational command data, or information request command data.

If the UM driver 136 determines that the data corresponds to the UM operation, the UM driver 136 may determine whether the UM operation corresponds to a UM read operation or to a UM write operation. If the UM operation is a UM write operation, the processor 132 may initiate the UM write operation to the UM area 138. Initiating the UM write operation may include sending a read command to the data storage device 102 to read a particular location of the memory 104 indicated by the command data, and writing the data read from the particular location into the UM area 138 based on the command data. If the operation is a UM read operation, the processor 132 may initiate the UM read operation to read data from the UM area 138. Initiating the UM read operation may include sending a write command to the data storage device 102. The write command to be send to the data storage device 102 may include the data read from the UM area 138.

If the command data corresponds to operational command data, the UM driver 136 may determine which operational command is to be performed by the host device 130, such as an operational command to put the data storage device 102 in a sleep mode, to provide additional power to the data storage device 102, to provide idle time to the data storage device 102 (e.g., to throttle one or more commands to be sent to the data storage device 102), etc., as illustrative, non-limiting examples. If the command data corresponds to information request command data, the UM driver 136 may determine which information request command the host device 130 is to execute, such as an information request command to provide vendor specific information (e.g., associated with a vendor of the host device 130).

During operation, the host device may send a notification 142 to the data storage device 102. The notification 142 may correspond to a first read command 146, such as a UM-enabling command that enables the data storage device 102 to direct the host device to access the UM area 138. The notification 142 may indicate a location (e.g., an address) of the memory 104 to be read based on the first read command 146 and may indicate an amount of data to be read based on the first read command 146. When the controller 120 receives the notification 142, the controller 120 may populate the entry 152 of the notification queue 128 and may clear the indicator 152.

The host device 130 may periodically or occasionally poll the notification queue 128 to identify whether one or more indicators corresponding to one or more entries of the notification queue 128 are set. To illustrate, the host device 130 may send a poll request 144 to the data storage device 102.

The controller 120 sets a particular indicator when the controller 120 is ready to execute a particular command that is associated with the particular indicator. For example, the indicator 152 may be asserted based on the controller 120 determining to use the first read command 146 to communicate, to the host device 130, command data (e.g., first data 154). The first command data 154 may include or correspond to UM command data, operational command data, or information request command data. The controller 120 may assert the indicator 152 after the controller 120 stores the first data 154 (e.g., the command data) at the location of the memory 104 indicated by the notification 142, such as the location indicated by the entry 150.

Based on a determination that the indicator 152 is asserted, the host device 130 may send the first read command 146 to the data storage device 102. The first read command 146 may specify the address (e.g., the location) of the memory 104 to be read. The first read command 146, when executed by the data storage device 102 (e.g., the controller 120) may cause the controller 120 to read the first data 154 (e.g., the command data) from the location of the memory 104 and to send the first data 154 to the host device 130.

The host device 130 may receive the first data 154 as part of a communication sent using the embedded memory protocol. The host device 130 may process the communication to identify the first data 154, and a driver (e.g., the UM driver 136) may determine whether the first data 154 corresponds to a UM read operation, a UM memory operation, an operational command, or an information request command. Based on a determination that the first data 154 corresponds to a UM write command, the host device 130 may determine, based on the first data 154, a particular storage location of the memory 104 that stores data (e.g., second data 156) to be written to the UM area 138 based on the UM write command. The host device 130 may generate and send a second read command 148 to the data storage device 102 to read the particular storage location of the memory 104 that stores the second data 156.

The host device 130 may receive the second data 156 and may execute the UM write command to write the second data 156 to the UM area 138 of the memory 134. For example, the host device 130 may write the second data 156 to a location of the UM area 138 indicated by the first data 154.

Based on a determination that the first data 154 corresponds to a UM read command, the host device 130 may determine, based on the first data 154, a location of the UM area 138 to be read. After reading the location of the UM area 138, the host device 130 may generate a write command (e.g., a non-UM-enabling command) to write the data read from the UM area 138 to a location of the memory 104, such as a location of the memory 104 indicated by the first data 154.

Based on a determination that the first data 154 corresponds to an operational command, the host device 130 may identify (e.g., determine) a particular operational command and send the particular operational command to the data storage device 102. Based on a determination that the first data 154 corresponds to an instruction request command, the host device 130 may identify (e.g., determine) particular information requested by the data storage device 102 and may send the particular information to the data storage device 102. For example, the host device 130 may send the particular information to the data storage device 102 as part of a write command to write data (e.g., a sector of data) to a storage location of the data storage device 102, such as a storage location of the data storage device 102 indicated by the first data 154.

In some embodiments, when the host device 130 sends a particular notification to the notification queue 128, the host device 130 may determine whether the notification queue 128 includes a particular entry that is associated with enabling the data storage device 102 to provide a memory sharing command (e.g., command data) to the host device 130. If the host device 130 determines that the notification queue 128 does not include the particular entry, the host device 130 may cause the particular entry to be created in the notification queue 128. Accordingly, the host device 130 may periodically or occasionally populate the notification queue 128 with an entry that enables the data storage device 102 to provide command data to the host device 130, such as command data associated with a UM operation performed by the host device 130.

In some embodiments, one or more slots of the notification queue 128 may be reserved (e.g., designated) to receive notifications corresponding to particular commands, such as a first read command associated with a UM-enabling command, a second read command associated with an operational command, or a third read command associated with an information request command, as illustrative, non-limiting examples. For example, a first slot may be reserved for UM-enabling commands that are used by the data storage device 102 to initiate a UM write operation. A second slot may be reserved for UM-enabling commands that are used by the data storage device to initiate a UM read operation. As another example, a single slot may be reserved for UM-enabling commands, such as UM-enabling commands that are used by the data storage device 102 to initiate UM read operations and/or UM write operations.

In other embodiments, the host device 130 and the data storage device 102 may identify a range of logical block addresses. A first portion (e.g. a first sub-range) of the logical block addresses may be used for non-UM-enabling commands and a second portion (e.g., a second sub-range) of the logical block addresses may be used for UM-enabling commands. For example, each logical block address included in the second sub-range may correspond to a storage location reserved for command data generated by the controller 120. Accordingly, when the data storage device 102 receives a command from the host device 130 that includes an address associated with the second sub-range, the data storage device 102 may identify the command as a UM-enabling command Additionally, a third portion (e.g. a third sub-range) of the logical block addresses may be used for enabling operational commands and a fourth portion (e.g., a fourth sub-range) may be used for enabling information request commands.

Although the host device 130 is illustrated as including a single memory (e.g., the memory 134), the host device 130 may include one or more additional memories. The memory 134, the one or more additional memories, or both, may be configured to store data and/or instructions that may be executable by the processor 132. Additionally, the memory 134 may be a single memory or may include more than one memory, such as one or more non-volatile memories, one or more volatile memories, or a combination thereof.

Although the notification queue 128 is illustrated as stored in the RAM 122 included in the controller 120, in other implementations the notification queue 128 may be stored in the memory 104 or in another memory that is coupled to the controller 120. Additionally or alternatively, the controller 120 may include a single memory component, such as the RAM 122, or may include multiple distinct memory components and/or multiple different types of memory components.

Additionally, the data storage device 102 may include an error correction code (ECC) engine (not shown). The ECC engine may be configured to receive data and to generate one or more error correction code (ECC) codewords (e.g., including a data portion and a parity portion) based on the data. For example, the ECC engine may include an encoder configured to encode the data using an ECC encoding technique. The ECC engine may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The ECC engine may include a decoder configured to decode data read from the memory 104 to detect and correct bit errors that may be present in the data. For example, the ECC engine may correct a number of bit errors up to an error correction capability of an ECC technique used by the ECC engine. A number of errors identified by the ECC engine may be tracked by the controller 120, such as by the ECC engine. For example, based on the number of errors, the ECC engine may determine a bit error rate (BER) associated with one or more blocks of the memory 104.

By utilizing the entry 150 of the notification queue 128, the data storage device 102 (e.g., a slave device) may be able to generate command data (e.g., UM operation data, operational command data, and/or information request command data) that may be provided to the host device 130. Additionally, the data storage device 102 may control when the command data is provided to the host device 130 based on when the data storage device 102 sets the indicator 152. When the command data is provided to the host device 130 in response to a UM-enabling command issued by the host device 130, the host device 130 may identify and perform a UM operation directed by the data storage device 102. Accordingly, the host device 130 (e.g., the master device) may receive directions (e.g., instructions) from the data storage device 102 (e.g., the slave device) to access the UM area 138 of the host device 130 without the data storage device 102 being able to issue commands directly to the host device 130 because of a master-slave relationship.

Figure 2:
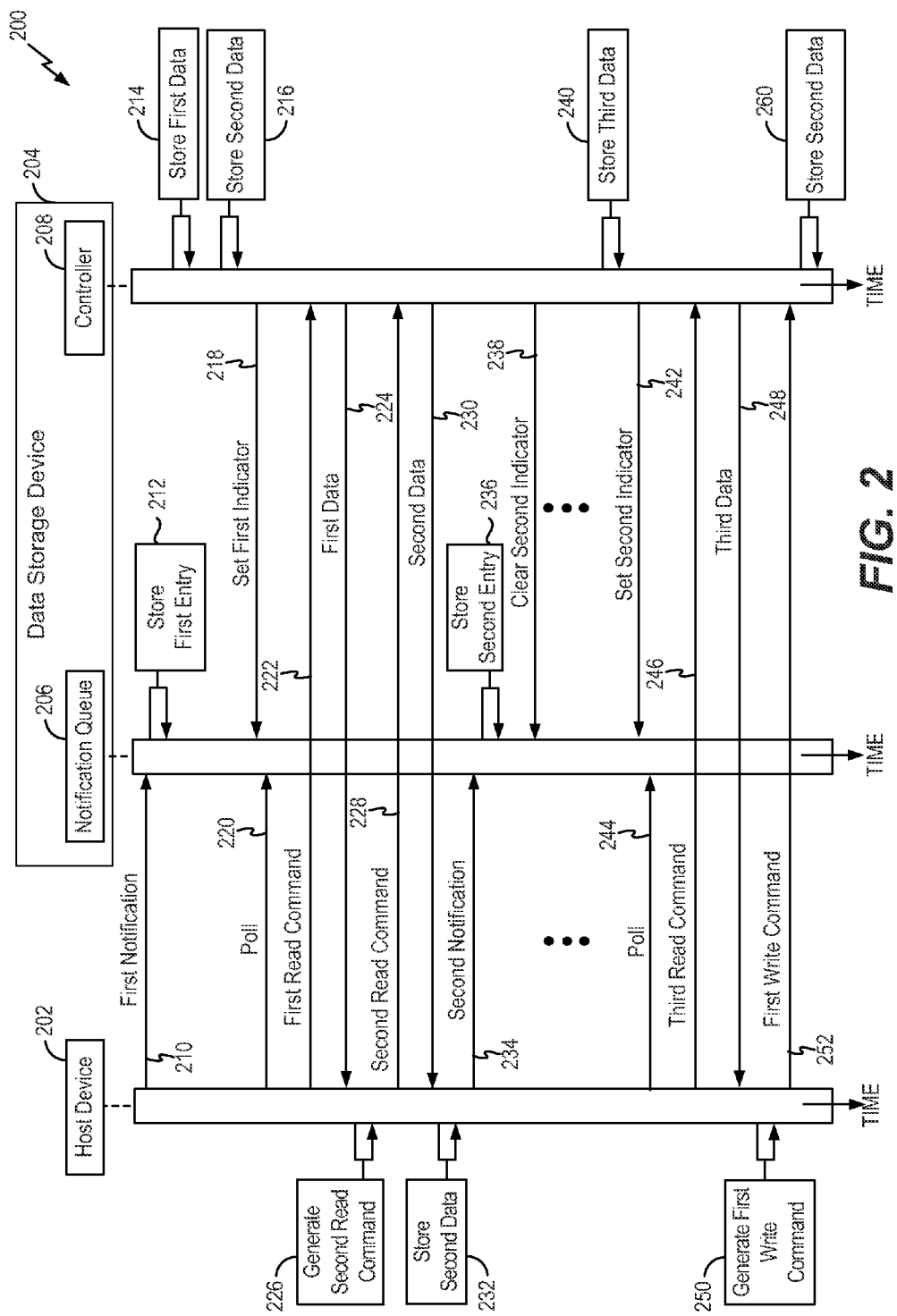
FIG. 2 is a ladder diagram illustrating operations to enable communication of command data in a master-slave environment.

Referring to FIG. 2, a first illustrative embodiment of a method 200 of communicating between a representative host device 202 and a representative data storage device 204 is shown. The method 200 is illustrated by a ladder diagram. The method 200 may be used to enable communication of command data in a master-slave environment. For example, the method 200 may enable use of a unified memory architecture (UMA) where the data storage device 204 may access a unified memory portion of a memory of the host device 202. The host device 202 and the data storage device 204 may include or correspond to the host device 130 and the data storage device 102 of FIG. 1, respectively.

The data storage device 204 may include a notification queue 206 and a controller 208. The notification queue 206 and the controller 208 may include or correspond to the notification queue 128 and the controller 120 of FIG. 1, respectively. As depicted in FIG. 2, the host device 202 is illustrated as communicating directly with the notification queue 206 for simplicity of illustration. Communication from the host device 202 to the notification queue 206 may occur via the controller 208.

The host device 202 may send, to the data storage device 204, a first notification corresponding to a first read command, at 210. The first notification may include or correspond to the notification 142 of FIG. 1.

Based on the first notification, a first entry may be stored in the notification queue 206, at 212. The first entry may correspond to the first read command (e.g., a UM-enabling command). For example, the first entry may include or correspond to the entry 150 of FIG. 1. The first entry may be stored in a slot (e.g., a portion) of the notification queue 206 that is designated for UM-enabling entries. The first read command may include or correspond to the first read command 146 of FIG. 1.

The controller 208 may store first data corresponding to a second command, such as a second read command, at a storage location of a non-volatile memory of the data storage device 204, at 214. For example, the first data may include or correspond to the first data 154 (e.g., command data) of FIG. 1. To illustrate, the first data may include or correspond to unified memory write command data that may cause the host device to write data to a unified memory area. The non-volatile memory of the data storage device 204 may include or correspond to the memory 104 of FIG. 1. The storage location may correspond to an address to be read upon execution of the first read command. The address may have been included in the first notification received by the data storage device 204 from the host device 130.

The controller 208 may store second data, at 216. For example, the second data may include or correspond to the second data 156 of FIG. 1. The second data may correspond to the second read command, such as data to be read based on execution of the second read command by the data storage device 204. For example, the second read command may include or correspond to the second read command 148. Although the second data is depicted as being stored subsequent to the first data, in other embodiments the second data may be stored prior to the first data.

After storing the first data and/or the second data, the controller 208 may set an indicator corresponding to the first entry, at 218. The indicator, when set, may convey to the host device 202 that the data storage device 204 is ready to execute the first read command. For example, the indicator may include or correspond to the indicator 152 of FIG. 1. After setting the indicator, the data storage device 204 may receive the first read command from the host device 202.

The host device 202 may poll the notification queue 206 to identify whether the first indicator is set, at 220. Based on the polling, the host device 202 may determine that the first indicator is set and that the data storage device 204 is ready to execute the first read command.

The host device 202 may send the first read command to the data storage device 204 (e.g., the controller 208), at 222. In response to the first read command, the data storage device 204 (e.g., the controller 208) may send the first data to the host device 202, at 224.

Based on the first data, the host device 202 may generate the second read command, at 226. For example, the host device 202 may determine that the first data corresponds to a UM write operation to be performed by the host device 202. For example, the UM write operation may be associated with a UM area of a memory of the host device 202, such as the UM area 138 of the memory 134 of FIG. 1. Based on the first data, the host device 202 may generate and send the second read command to the data storage device 204 (e.g., the controller 208), at 228. The second read command may be configured to cause the data storage device 204 to read the second data from the non-volatile memory of the data storage device 204.

In response to receiving the second command from the host device 202, the data storage device 204 (e.g., the controller 208) may send the second data to the host device 202, at 230. To illustrate, the controller 208 may read the second data from a portion of the non-volatile memory designated by the second command.

The host device 202 may store the second data at a volatile memory of the host device, at 232. For example, the volatile memory may include or correspond to the memory 134 of FIG. 1, and the host device 202 may store the second data at the UM area of the volatile memory. The host device 202 may send a second notification to the data storage device 204, at 234. The second notification may correspond to a third read command (e.g., a UM-enabling command).

Based on the second notification, the data storage device 204 may store a second entry in the notification queue 206, at 236. When the second entry is generated, the controller 208 may clear an indicator, such as a second indicator, corresponding to the second entry. For example, the controller 208 may clear a second indicator corresponding to the second entry, at 238.

The controller 208 may store third data (e.g., command data) at a second storage location of the non-volatile memory of the data storage device 204, at 240. For example, the third data may correspond to a first write command that is associated with retrieval of the second data from the memory of the host device 202. To illustrate, the third data may include or correspond to unified memory read command data that may cause the host device to read data from a unified memory area. The second storage location may correspond to an address to be read upon execution of the third read command. After storing the third data, the controller 208 may set the second flag of the notification queue 206, at 242.

The host device 202 may poll the notification queue 206 to identify if the second indicator is set, at 244. Based on the polling, the host device 202 may determine that the second indicator is set and that the data storage device 204 is ready to execute the third command. The host device 202 may send the third read command to the data storage device 204 (e.g., the controller 208), at 246.

In response to the third read command, the data storage device 204 (e.g., the controller 208) may send the third data to the host device 202, at 248. The host device 202 may process the third data and determine that the third data (e.g., command data) is associated with a UM read operation. Based on the third data, the host device may read a location of the UM area, such as a location that stores the second data, and may generate the first write command, at 250. The first write command may include the second data that the data storage device 204 directed the host device 202 to read based on the UM read operation.

The host device 202 may send the first write command including the second data to the data storage device 204 (e.g., the controller 208), at 252. In response to receiving the first write command, the data storage device 204 (e.g., the controller 208) may store the second data at the non-volatile memory of the data storage device 204, at 260.

Utilizing the notification queue 206, the data storage device 204 may cause the host device 202 to send a read command to the data storage device 204. The data storage device 204 may store command data at a location to be read in response to the read command. The command data may correspond to a UM read operation or a UM write operation to be performed by the host device 202. Accordingly, when the host device 202 sends the read command, the host device 202 may receive directions (e.g., instructions) from the data storage device 204 to access a UM portion of a memory of the host device 202 when the host device 202 and the data storage device 204 are in a master-slave relationship.

Figure 3:
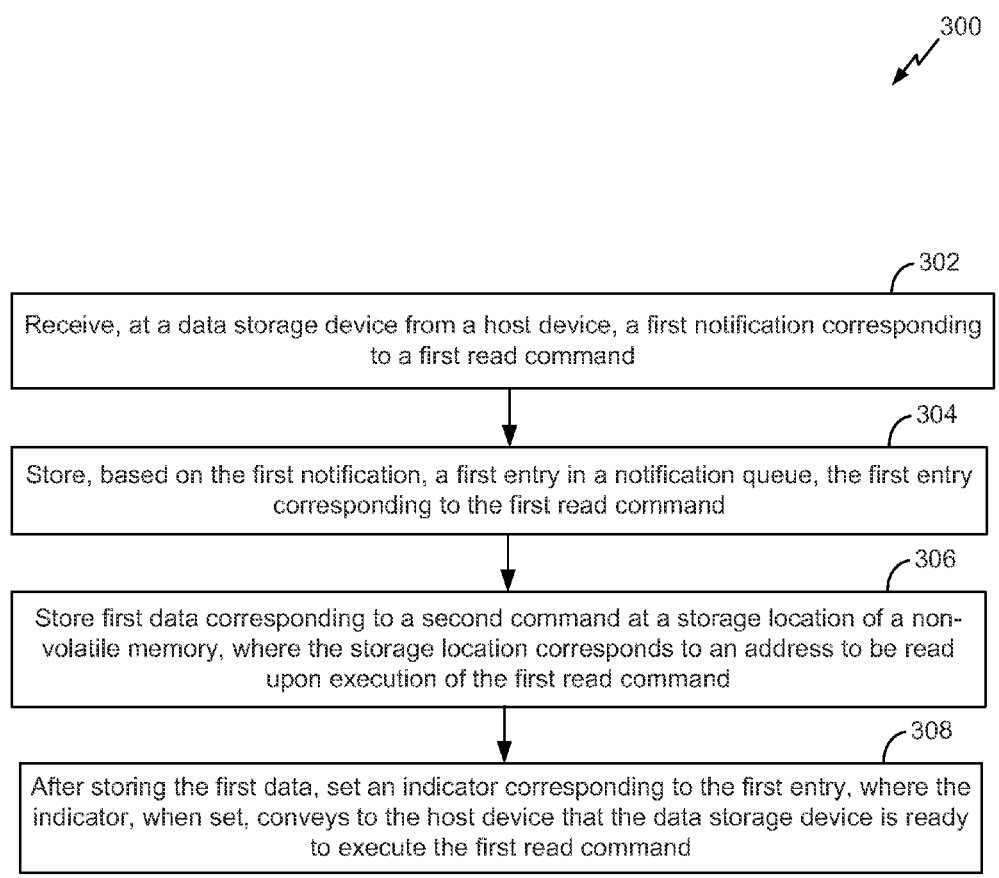
FIG. 3 is a flow diagram of an illustrative embodiment of a method to enable communication of command data in a master-slave environment.

Referring to FIG. 3, an illustrative embodiment of a method 300 to enable communication of command data in a master-slave environment is shown. For example, the method 300 may enable use of a unified memory architecture (UMA) where a data storage device may access a unified memory portion of a memory of the host device. For example, the method 300 may be performed by a controller of the data storage device, such as by the controller 120 of the data storage device 102 of FIG. 1 or the controller 208 of the data storage device 204 of FIG. 2. The host device may include or correspond to the host device 130 of FIG. 1 or the host device 202 of FIG. 2.

The method 300 includes receiving, from a host device, a first notification corresponding to a first read command, at 302. The controller may be configured to interact with the host device by using an embedded memory protocol. To illustrate, the embedded memory protocol may be an embedded flash memory protocol. The host device may include or correspond to the host device 130 of FIG. 1 or the host device 202 of FIG. 2. The first notification and the first read command may correspond to the notification 142 and the first read command 146 of FIG. 1, respectively.

The method 300 also includes storing, based on the first notification, a first entry in a notification queue, the first entry corresponding to the first read command, at 304. The controller may include a volatile memory, such as the RAM 122 of FIG. 1. The volatile memory may include the notification queue. For example, the notification queue may include or correspond to the notification queue 128 of FIG. 1 or the notification queue 206 of FIG. 2. The notification queue may include a dedicated entry location associated with the first read command.

The method 300 includes storing first data corresponding to a second command at a storage location of a non-volatile memory, at 306. The first data may include or correspond to the first data 154 of FIG. 1. The non-volatile memory may be included in the data storage device. For example, the non-volatile memory may include or correspond to the memory 104. The storage location may correspond to an address to be read upon execution of the first read command. The first data may be associated with command data, such as unified memory read command data, unified memory write command data, operational command data, or information request command data. The second command may be associated with an operation to be performed by the host device, such as an operation to be performed at a memory (e.g., a UM area of the memory) of the host device. The memory of the host device may include or correspond to the memory 134 of FIG. 1.

The method 300 also includes, after storing the first data, setting an indicator corresponding to the first entry, where the indicator, when set, conveys to the host device that the data storage device is read to execute the first read command, at 308. For example, the indicator may include or correspond to the indicator 152 of FIG. 1.

Although the data storage device 204 is described as storing the first data (e.g., unified memory write command data) and storing the third data (e.g., unified memory read command data), the data storage device 204 may store other command data. For example, the data storage device 204 may store the other command data, such as operational command data and/or information request command data, and provide the other command data to the host device 202 as part of execution of a read command sent from the host device 202 to the data storage device 204.

The method 300 may enable the data storage device to generate command data that may be provided to the host device. Accordingly, the data storage device may provide directions (e.g., instructions) to the host device to access a UM portion of a memory of the host device when the host device and the data storage device are in a master-slave relationship.

The method 200 of FIG. 2 and/or method 300 of FIG. 3 may be initiated or controlled by an application-specific integrated circuit (ASIC), a processing unit, such as a central processing unit (CPU), a digital signal processor (DSP), a controller, another hardware device, a firmware device, a field-programmable gate array (FPGA) device, or any combination thereof. As an example, the method 200 of FIG. 2 and/or the method 300 of FIG. 3 can be initiated or controlled by one or more processors included in or coupled to the data storage device 102 of FIG. 1, such as one or more processors included in or coupled to the controller 120 of FIG. 1, one or more processors included in or coupled to the host device 130 (e.g., the processor 132) of FIG. 1, one or more processors included in or coupled to the host device 202 or the data storage device 204 of FIG. 2.

A controller configured to perform the method 200 of FIG. 2 and/or the method 300 of FIG. 3 may be able to advantageously enable communication of command data in a master-slave environment, such as command data generated by a data storage device (e.g., a slave device) and communicated to a host device (e.g., a master device). Although various components of the data storage device 102 and the host device 130 depicted herein are illustrated as block components and described in general terms, such components may include one or more microprocessors, state machines, or other circuits configured to enable the controller 120 and/or the processor 132 of FIG. 1 to perform operations described herein. One or more aspects of the controller 120 and/or the processor 132 may be implemented using a microprocessor or microcontroller programmed to perform operations described herein, such as one or more operations of the method 200 of FIG. 2 and/or the method 300 of FIG. 3. In a particular embodiment, the controller 120 and/or the processor 132 includes a processor executing instructions that are stored at a memory, such as a non-volatile memory of the data storage device 102 or the host device 130. Alternatively or additionally, executable instructions that are executed by the processor may be stored at a separate memory location that is not part of the non-volatile memory, such as at a read-only memory (ROM) of the data storage device 102 or the host device 130.

In an illustrative example, the processor may execute the instructions to receive, from a host device, a first notification corresponding to a first read command. The instructions to receive the first notification may include instructions to receive a communication generated using an embedded memory protocol, instructions to process the communication to identify notification data, and/or instructions to instructions to determine whether the notification corresponds to a UM-enabling command, as illustrative, non-limiting examples. The processor may execute instructions to store, based on the first notification, a first entry in a notification queue. The first entry may correspond to the first read command. The instructions to store the first notification may include instructions to identify an available slot of the notification queue, instructions to identify a slot of the notification queue corresponding to UM-enabling commands, instructions to clear an indicator corresponding to the first entry, and/or instructions to populate the first entry, as illustrative, non-limiting examples. The processor may execute instructions to store first data corresponding to a second command at a storage location of the non-volatile memory. The storage location may correspond to an address to be read upon execution of the first read command. The instructions to store the first data may include instructions to identify the first entry as a UM-enabling command, instructions to determine the storage location based on the first entry, instructions to determine whether to initiate a UM read operation or a UM write operation, instructions to instructions to identify an address (e.g., a storage location) of a UM area of the host device, and/or instructions to identify a storage location of the non-volatile memory that includes data to be written to the UM area of the host device, as illustrative, non-limiting examples. The processor may execute instructions to set an indicator corresponding to the first entry after storing the first data. The indicator, when set, may convey to the host device that the data storage device is ready to execute the first read command. The instructions to set the indicator may include instructions to set a bit value of the first entry and/or instructions to activate a pin of an interface (e.g., a host interface of the data storage device), as illustrative, non-limiting examples.

The data storage device 102 may be attached to or embedded within one or more host devices, such as within a housing of a host communication device, which may correspond to the host device 130. The data storage device 102 may be within a packaged apparatus such as a wireless telephone, a personal digital assistant (PDA), a gaming device or console, a portable navigation device, a computer device (e.g., a tablet or a laptop), or other device that uses internal non-volatile memory. However, in other embodiments, the data storage device 102 may be a portable device configured to be selectively coupled to one or more external devices, such as the host device 130. For example, the data storage device 102 may be a removable device such as a Universal Serial Bus (USB) flash drive or a removable memory card, as illustrative examples.

In an illustrative example, the processor may execute the instructions to receive first data from a data storage device responsive to a first read command sent to the data storage device by the host device. The instructions to receive the first data may include instructions to poll an indicator corresponding to the first read command, instructions to determine that an indicator associated with a notification queue of the data storage device is set, and/or instructions to generate the first read command to read the first data from a location of a memory of the data storage device, as illustrative, non-limiting examples. The processor may execute instructions to determine whether the first data corresponds to a unified memory (UM) access operation. The instructions to determine whether the first data corresponds to a unified memory (UM) access operation may include instructions to receive a communication including the first data, instructions to process the communication using an embedded memory protocol, instructions to process the first data using a UM driver of the host device, instructions to parse the first data, instructions to determine whether the first data corresponds to a UM read operation, instructions to determine whether the first data corresponds to a UM write operation, instructions to identify a storage location of a memory of the data storage device based on the first data, and/or instructions to identify a storage location of a UM area of a memory of the host device, as illustrative, non-limiting examples. The processor may execute instructions to execute a particular UM access operation based on a determination that the first data corresponds to the UM access operation. The instructions to execute the particular UM access operation may include instructions to read a location of the UM area of the host device, instructions to generate a write command to be sent to the data storage device to write data read from the UM area of the host device, instructions to instructions to generate a read command to be sent to the data storage device to read data from a location of a memory of the data storage device, instructions to write, to the UM area of the host device, and/or data read based on read command issued to the data storage device from the host device, as illustrative, non-limiting examples.

The host device 130 may correspond to a mobile telephone, a music player, a video player, a gaming device or console, an electronic book reader, a personal digital assistant (PDA), a computer, such as a laptop, a tablet, or a notebook computer, a portable navigation device, another electronic device, or a combination thereof. The host device 130 may communicate via a host controller, which may enable the host device 130 to communicate with the data storage device 102. The host device 130 may operate in compliance with a JEDEC Solid State Technology Association industry specification, such as an embedded MultiMedia Card (eMMC) specification or a Universal Flash Storage (UFS) Host Controller Interface specification. The host device 130 may operate in compliance with one or more other specifications, such as a Secure Digital (SD) Host Controller specification, as an illustrative example. Alternatively, the host device 130 may communicate with the data storage device 102 in accordance with another communication protocol.

The data storage device 102 may be configured to be coupled to the host device 130 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

Semiconductor memory devices, such as the memory 104 and/or the memory 134, include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., in a NOR memory array. NAND and NOR memory configurations described have been presented as examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor material, such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements arranged on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material, such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. To illustrate, each of the memory device levels may have a corresponding substrate thinned or removed before stacking the memory device levels to form memory arrays. Because each of the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

In some implementations, the memory 104 and/or the memory 134 is a non-volatile memory having a three-dimensional (3D) memory configuration that is monolithically formed in one or more physical levels of arrays of memory cells having an active area disposed above a silicon substrate. The active area of a memory cell may be an area of the memory cell that is conductively throttled by a charge trap portion of the memory cell. The data storage device 102 may include circuitry, such as read/write circuitry, as an illustrative, non-limiting example, associated with operation of the memory cells.

Associated circuitry is typically used for operation of the memory elements and for communication with the memory elements. As non-limiting examples, memory devices may have circuitry for controlling and driving memory elements to perform functions such as programming and reading. The associated circuitry may be on the same substrate as the memory elements and/or on a separate substrate. For example, a controller for memory read-write operations may be located on a separate controller chip and/or on the same substrate as the memory elements One of skill in the art will recognize that this disclosure is not limited to the two dimensional and three dimensional structures described but cover all relevant memory structures within the spirit and scope of the disclosure as described herein and as understood by one of skill in the art.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   in a data storage device that includes a non-volatile memory and that is coupled to a host device in a master-slave configuration, performing:
   receiving, from the host device, a first notification corresponding to a first read command;
   storing, based on the first notification, a first entry in a notification queue, the first entry corresponding to the first read command;
   storing first data corresponding to a second command at a storage location of the non-volatile memory, wherein the storage location corresponds to an address to be read upon execution of the first read command, and wherein the second command is associated with an operation to be performed by the host device; and
   after storing the first data, setting an indicator corresponding to the first entry, wherein the indicator, when set, conveys to the host device that the data storage device is ready to execute the first read command.

2. The method of claim 1, wherein the data storage device is a slave device, wherein the host device is a master device of the data storage device, and wherein the first notification identifies the storage location of the non-volatile memory.

3. The method of claim 1, wherein the first data is associated with command data, and wherein the command data includes unified memory read command data, unified memory write command data, operational command data, or information request command data.

4. The method of claim 1, wherein the operation is to be performed at a memory of the host device, wherein the memory comprises a random access memory (RAM) of the host device, and wherein the second command corresponds to a memory access operation to be performed on a unified memory area of the RAM.

5. The method of claim 4, wherein a first portion of the notification queue is allocated to enable the data storage device to direct the host device to perform a read operation of the unified memory area of the RAM of the host device, and wherein a second portion of the notification queue is allocated to enable the data storage device to direct the host device to perform a write operation on the unified memory area of the RAM of the host device.

6. The method of claim 1, further comprising:
   after setting the indicator, receiving the first read command from the host device; and
   responsive to the first read command, sending the first data to the host device, wherein the data storage device receives the second command after the first data is sent to the host device.

7. The method of claim 6, wherein the second command is a second read command, and further comprising, responsive to receiving the second command from the host device, sending second data to the host device from the data storage device, wherein the second data is read from a portion of the non-volatile memory of the data storage device designated by the second command.

8. The method of claim 7, further comprising:
after setting the indicator, receiving, from the host device, a second notification corresponding to a third read command;
storing, based on the second notification, a second entry in the notification queue, the second entry corresponding to the third read command; and
clearing a second indicator corresponding to the second entry.

9. The method of claim 8, further comprising:
after clearing the second indicator, initiating retrieval of the second data from the volatile memory of the host device to the data storage device by:
storing third data corresponding to a first write command at a second storage location of the non-volatile memory, wherein the second storage location corresponds to an address to be read upon execution of the third read command; and
after storing the third data, setting the second flag of the notification queue.

10. The method of claim 9, further comprising:
after setting the second flag, receiving the first write command from the host device, the first write command including the second data; and
responsive to the first write command, storing the second data at the non-volatile memory.

11. The method of claim 1, wherein the non-volatile memory includes a three-dimensional (3D) memory configuration that is monolithically formed in one or more physical levels of arrays of memory cells having an active area disposed above a silicon substrate, and wherein the data storage device includes circuitry associated with operation of the memory cells.

12. A data storage device comprising:
a non-volatile memory including a plurality of storage locations; and
a controller operatively coupled to the non-volatile memory and configured to be coupled to a host device in a master-slave configuration, wherein the controller is configured to store, based on a first notification received from the host device, a first entry in a notification queue, the first entry corresponding to a first read command, wherein the controller is configured to store first data corresponding to a second command at a storage location of the non-volatile memory, the second command associated with an operation to be performed by the host device, the storage location corresponding to an address to be read upon execution of the first read command, wherein the controller is configured to, after the first data is stored, set an indicator corresponding to the first entry, and wherein the indicator, when set, conveys to the host device that controller is ready to initiate execution of the first read command.

13. The data storage device of claim 12, wherein the controller includes a volatile memory, wherein the volatile memory includes the notification queue.

14. The data storage device of claim 12, wherein the notification queue includes a dedicated entry location associated with the first read command, and wherein the storage location corresponds to a range of logical block addresses reserved for command data generated by the controller.

15. The data storage device of claim 12, wherein the controller is configured to interact with the host device by using an embedded memory protocol.

16. The data storage device of claim 15, wherein the embedded memory protocol is an embedded flash memory protocol.

17. The data storage device of claim 12, wherein, when the host device sends a particular notification to the notification queue, the host device is configured to determine whether the notification queue includes a particular entry that is associated with enabling the data storage device to provide a memory sharing command to the host device, and, if the notification queue does not include the particular entry, the host device is configured to cause the particular entry to be created in the notification queue.

18. The data storage device of claim 12, wherein the notification queue is periodically polled by the host device to identify whether one or more indicators corresponding to one or more entries are set, and wherein, when a particular indicator is set, the controller is configured to receive, from the host device, a particular command to be executed that is associated with the particular indicator.

19. The data storage device of claim 12, further comprising a host interface, wherein the host interface enables communication between the controller and the host device when the host interface is coupled to the host device, and wherein the controller is configured to set the indicator by activating a pin of the host interface.

20. The data storage device of claim 12, wherein the non-volatile memory includes a three-dimensional (3D) memory configuration that is monolithically formed in one or more physical levels of arrays of memory cells having an active area disposed above a silicon substrate, and further comprising circuitry associated with operation of the memory cells.

* * * * *